United States Patent [19]
Gebhard et al.

[11] Patent Number: 5,810,691
[45] Date of Patent: Sep. 22, 1998

[54] HYDRAULIC CHANGING DEVICE FOR A MULTI-RATIO VEHICLE TRANSMISSION

[75] Inventors: Wolfgang Gebhard; Eduard Heilig, both of Friedrichshafen, Germany

[73] Assignee: ZF Friedrichshafen AG, Friedrichshafen, Germany

[21] Appl. No.: 727,445

[22] PCT Filed: Apr. 15, 1995

[86] PCT No.: PCT/EP95/01422

§ 371 Date: Oct. 18, 1996

§ 102(e) Date: Oct. 18, 1996

[87] PCT Pub. No.: WO95/29351

PCT Pub. Date: Nov. 2, 1995

[30] Foreign Application Priority Data

Apr. 22, 1994 [DE] Germany ............... 44 14 141.6

[51] Int. Cl.⁶ .................. F16H 59/04; B60K 20/00
[52] U.S. Cl. .................. 477/143; 477/148; 477/125; 477/83; 74/336 R
[58] Field of Search .................. 477/129, 130, 477/125, 143, 148, 83, 84; 74/336 R

[56] References Cited

U.S. PATENT DOCUMENTS 3,682,014  8/1972  Magg et al. .
3,738,198  6/1973  Kell .
3,937,107  2/1976  Lentz .
5,172,611  12/1992 Eymuller et al. .
5,528,949  6/1996  Stainton et al. ................ 74/336 R
5,622,080  4/1997  Furukawa ...................... 477/125 X

FOREIGN PATENT DOCUMENTS 2294364  12/1974  France .
1946496  3/1971   Germany .
2040195  2/1972   Germany .

Primary Examiner—Khoi Q. Ta
Attorney, Agent, or Firm—Davis and Bujold

[57] ABSTRACT

The invention relates to a hydraulic changing device for a multi-ratio vehicle transmission, especially for a commercial vehicle such as a mobile excavator. The hydraulic changing device feeds gear actuator (3, 4) with pressure medium conveyed by a servopump (10). There is a control slide (26) which is acted upon by the effect of a control spring (33), on the one hand, and by a pressure in a low-pressure chamber (23), on the other. The low-pressure chamber (23) is coupled to a low-pressure pump (20) operating in dependence upon the engine speed. The arrangement is completed by a shuttle valve (6) and a leakage valve (5). The pressure prevailing in the low-pressure chamber (23) actuates the control slide (26), against the force of the control spring (23), in such a way that undesired changes from a higher to a lower gear are prevented. The hydraulic changing device, of the invention, is advantageously distinguished by its low structural and design expenditures.

5 Claims, 4 Drawing Sheets

— 5,810,691 —

HYDRAULIC CHANGING DEVICE FOR A MULTI-RATIO VEHICLE TRANSMISSION

BACKGROUND OF THE INVENTION

The invention relates to a hydraulic changing device for a multi-ratio vehicle transmission according to the preamble of claim 1.

DE-A 40 11 033 (corresponding to U.S. Pat. No. 5,172,611) has disclosed a hydraulic changing device for a multi-ratio vehicle transmission of the related type. To prevent inadmissible downshifts, the changing device contains a pilot valve and a control valve. The pilot valve is connected, by a gearshift valve, with a servopump or a container. The individual gears of the vehicle transmission are changed by another connection to actuator devices. The control valve is connected, via a line, with a low-pressure pump whose operation depends on the engine speed. Both possible switching positions of the pilot valve are dependently affected by the engine speed-by the control valve. If, in order to engage the low gear, the gearshift valve is actuated while the high gear is engaged at an engine speed above a specific limiting value, while the pilot valve is held in its momentary switching position and thus a downshift is prevented. Said downshift only takes place when the engine speed has reached the specific limiting value at which the control valve changes its switching position. Said downshift blockage prevents an over-speed of the prime mover which would occur if the vehicle transmission were downshifted from the high gear to the low gear while the prime mover is at high speed.

SUMMARY OF THE INVENTION

The problem on which this invention is based is to simplify, practically and structurally, the existing hydraulic changing device.

The problem on which the invention is based is solved by a hydraulic changing device according to the main claim. Claims 2 to 6 refer to advantageous embodiments of the object according to the main claim.

Other features, essential to the invention and the advantages resulting therefrom, are to be understood from the description that follows of one embodiment of a hydraulic changing device in the example of a two-gear vehicle transmission for a mobile excavator or loader.

BRIEF DESCRIPTION OF THE DRAWING(S)

In the drawings:

FIG. 1 is a diagrammatic partly cut away view, of a hydraulic changing device, when the low gear is engaged; and FIG. 2 to FIG. 4 depict the hydraulic changing device of FIG. 1 in different changing positions according to existing operating conditions.

DESCRIPTION OF THE PREFERRED EMBODIMENT(S)

Figure 1:
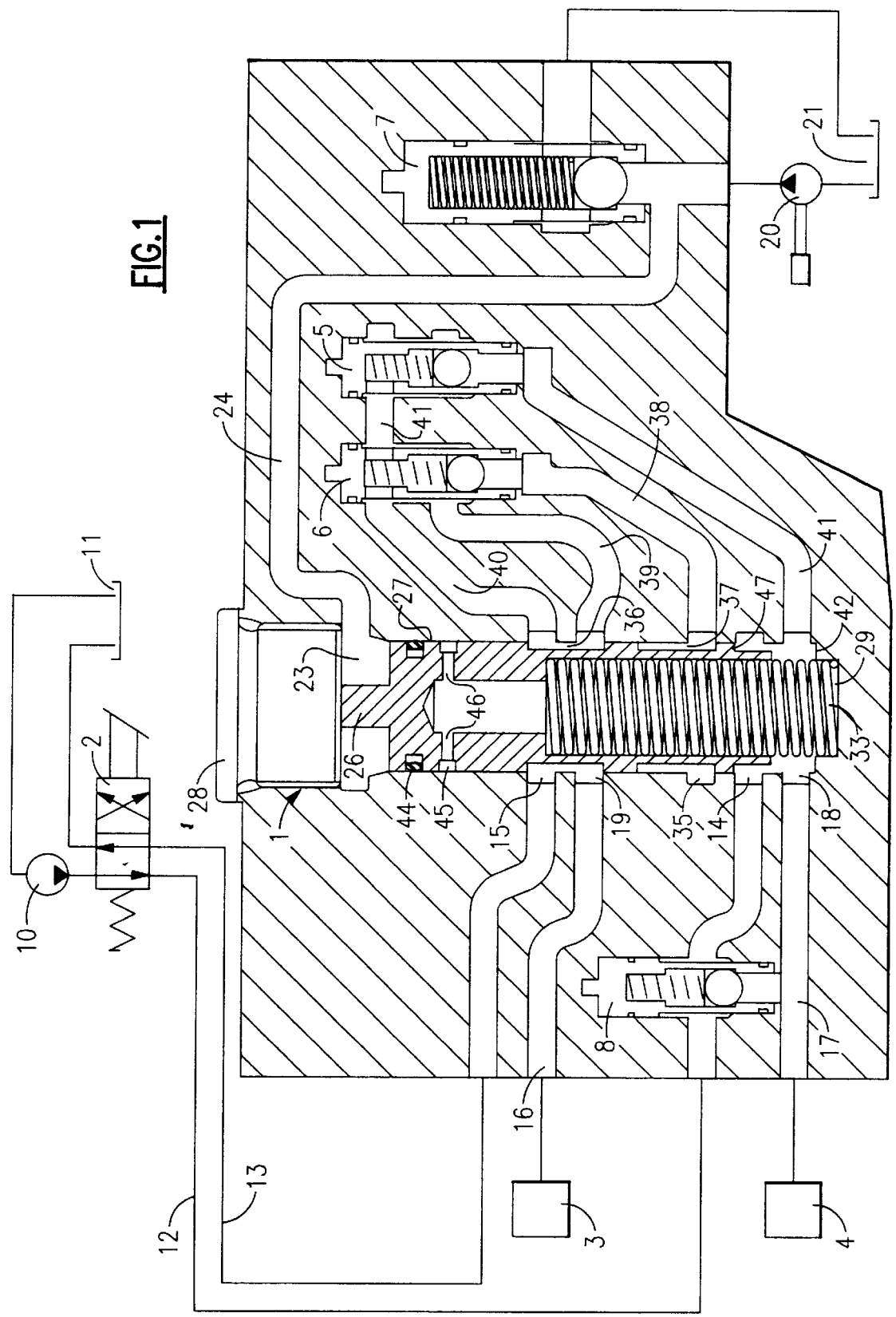

A servopump 10 conveys pressure medium, via a gear-change valve 2, from a tank 11 to a stop valve 1. For this purpose, the gear-change valve 2 is attached, via a first work line 12 and a second work line 13, to a first annular duct 14 and to a second annular duct 15. A third annular duct 18 communicates with the first annular duct 14 and a fourth annular duct 19 communicates with the second annular duct 15.

A connecting line 17 leads from the third annular duct 18 to a gear actuator 4 (first gear) of the vehicle transmission, not shown.

A connecting line 16 leads from the fourth annular duct 19 to a gear actuator 3 (second gear).

One control slide 26 of a stop valve 1 is axially movably situated in a valve cylinder 27. The valve cylinder 27 is locked by a screw 28.

The control slide 26 can be converted to two switching positions by adjusting forces which act upon its front faces.

As depicted in top of the drawings, the upper front face of the control slide 26 exerts an adjusting force dependent on the pressure prevailing in a low-pressure chamber 23.

The opposite front face abuts a control spring 33 which exerts an adjusting force directed opposite to the hydraulic adjusting force mentioned above.

The low-pressure chamber 23 communicates, via a low-pressure duct 24, with a low-pressure pump 20. The low-pressure pump is driven in dependence on the engine speed and an oil pressure is produced dependent on the input speed. The maximum delivery pressure of the low pressure 20 is limited by a pressure-limiting valve 7. If the low pressure pump reaches a maximum value, the pressure-limiting valve 7 opens and, as can be seen from the drawings, releases to a tank 21 via a return line.

From an annular duct 35 in the valve cylinder 27, a line 38 extends to a shuttle valve 6. Other lines 39 and 40 connect the shuttle valve 6 with the fourth annular duct 19 or second annular duct 15.

Another line 41 extends from the third annular duct 18 to a leakage valve 5. A connection 42 extends from the leakage valve 5 to the shuttle valve 6.

Engagement of the First Gear, FIG. 1

The gear-change valve 2 is shifted so as to connect the servopump 10 with the first work line 12. The pressure prevailing in the first work line 12 closes the recoil valve 8 towards the connecting line 17. The pressure fluid reaches, via the first annular duct 14, the third annular duct 18 and the connecting line 17, the gear actuator 4. The first gear is engaged.

A connection from the gear actuator 3 to the tank 11 exists via the connecting line 16, the fourth annular duct 19, the second annular duct 15, the second work line 13 and the open gear-change valve 2. This means that the pressure in the gear actuator 3 decreases toward the tank 11. The gear actuator 3 is thus pressureless.

At speeds (road speeds) below a downshift point, the delivery pressure of the low-pressure pump 20 is so weak that the force of the control spring 33 outweighs and—as can be seen from the drawings—presses the control slide 26 against the screw 28. Here the control slide 26 releases the connection of the first work line 12 to the gear actuator 4, in the manner mentioned, via the connecting line 17. From the gear actuator 3, a pressure decrease via the connecting line 16 to the second work line 13 and to the tank 11 is possible.

At speeds (road speeds) above the downshift point, the delivery pressure of the low-pressure pump 20 is so strong as to outweigh the force of the control spring 33 and thus the control slide 26 moves downwards (referring to the drawings). The control slide 26 is pressed against a stop 42.

In the second switching position of the control slide 26, the control edge pair 47 separates the first annular duct 14 from the third annular duct 18.

At the first switching position of the control slide 26, an engagement of the first and second gears is possible, in the second switching position of the control slide 26 a switch from the first to the second gear is not possible.

Engagement of the Second Gear Below the Downshift Point, FIG. 2

The zone of the gear-change valve 2 lying to the right is engaged. The pressure medium conveyed by the servopump 10 reaches, via the second work line 13, the second annular duct 15. Starting from here a connection to the gear actuator 3 exists via the fourth annular duct 19 and the connecting line 16. Via the line 40 and the shuttle valve 6, closed toward line 38, the pressure medium flows farther via the line 39 to the connecting line 16 and, departing from the shuttle valve 6, via the line 41, to the leakage valve 5. The leakage valve 5 is closed toward the line 41.

The pressure prevalent in the gear actuator 4 is reduced, via the connecting line 17, the open recoil valve 8 and the first work line, toward the tank 11.

Figure 3:
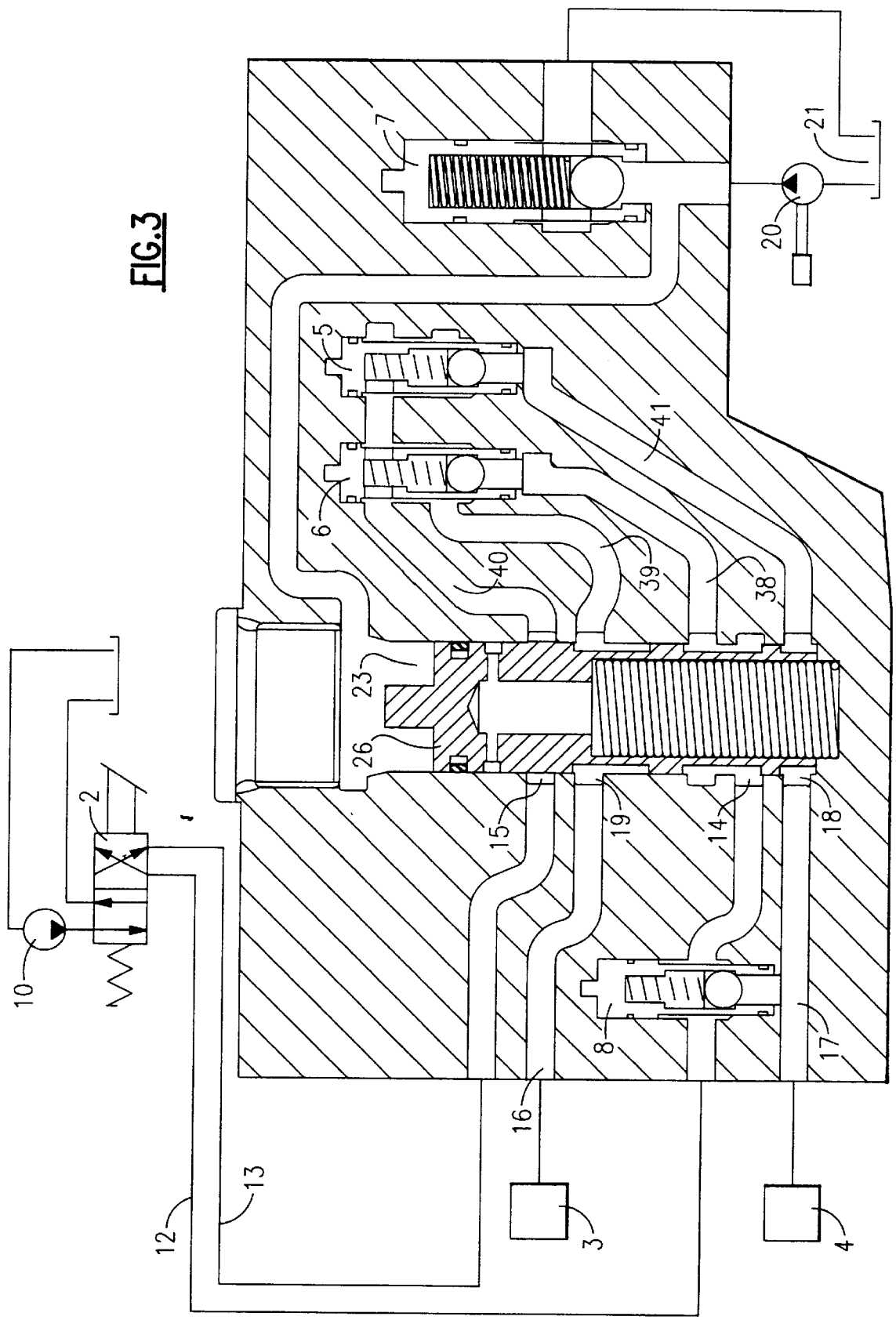

Engagement of the Second Gear Above the Downshift Point, FIG. 3

Figure 2:
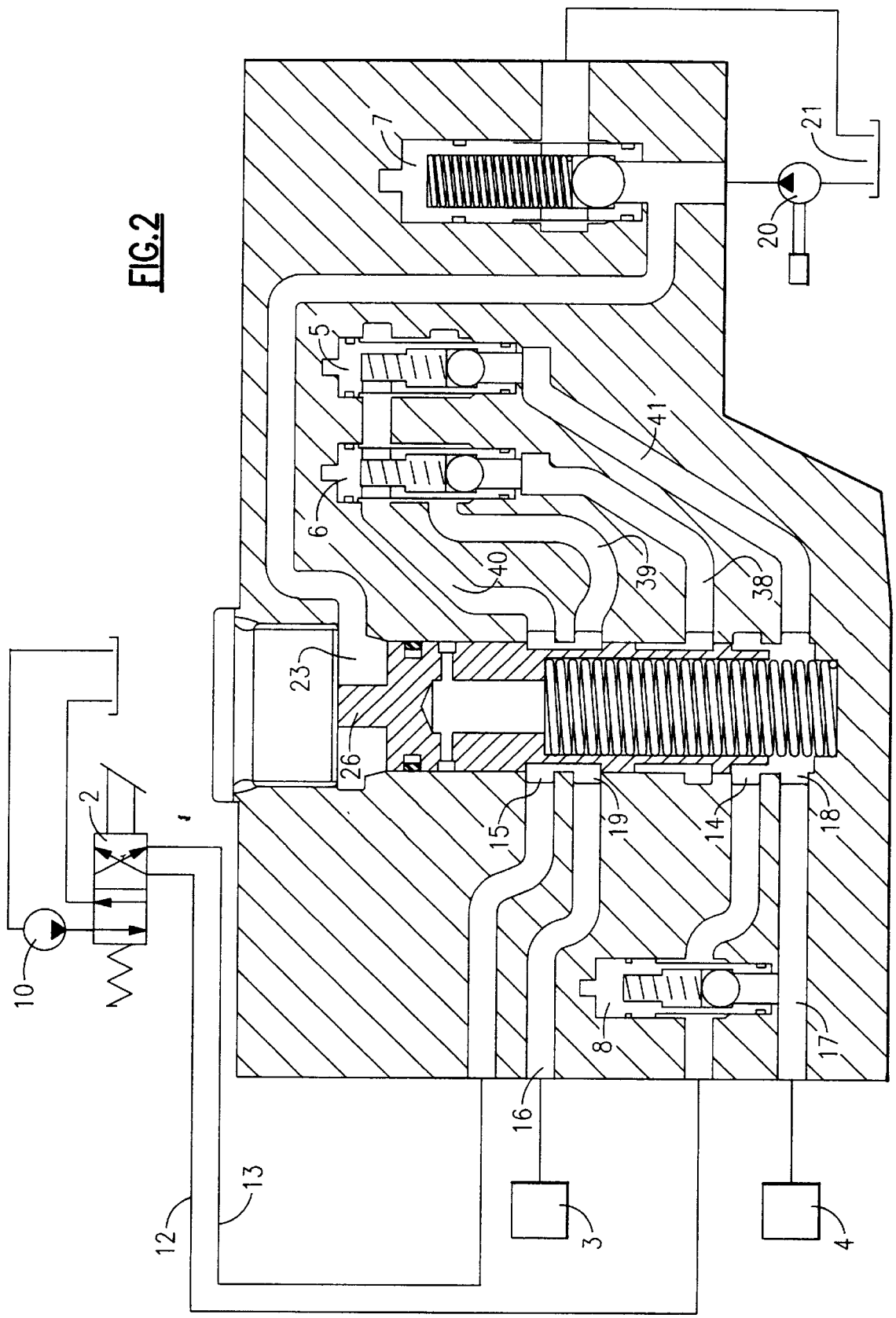

The position of the gear-change valve 2 corresponds to FIG. 2. The pressure medium reaches, via the second work line, the shuttle valve 6 and from here reaches, via the line 39 through the connecting line 16, the gear actuator device 3. The shuttle valve 6 and the leakage valve 5 are closed toward lines 38 and 41. The pressure prevailing in the gear actuator 4 is reduced, via the connecting line 17, the open recoil valve 8, the first work line 12 and the gear-change valve 2, toward the tank 11. Since the control edge pair 47 separates the first annular duct 14 from the third annular duct 18, an engagement of the first gear is not possible.

Figure 4:
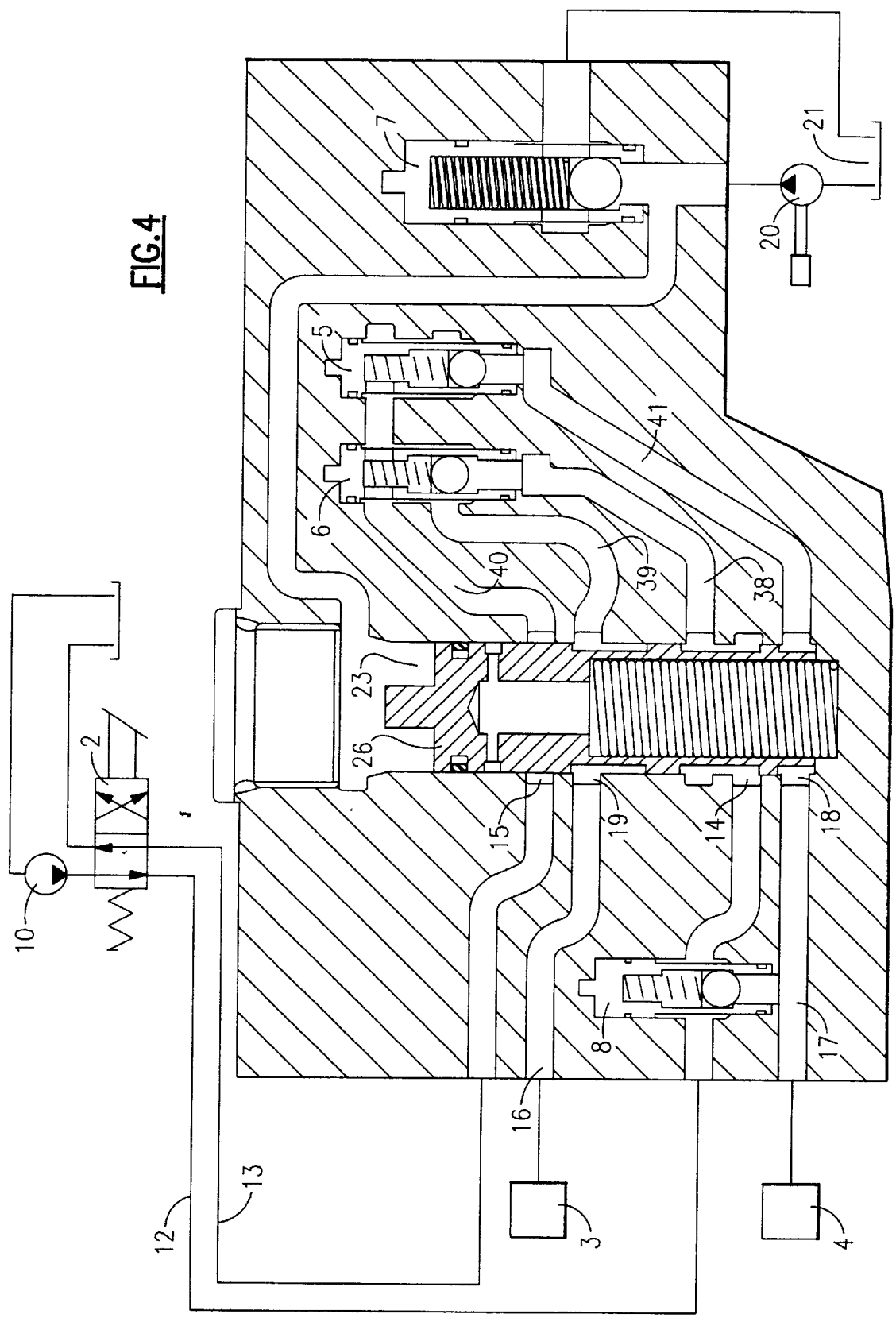

Downshift From the Second to the First Gear Above the Downshift Point or Pre-selection of the First Gear, FIG. 4

When the speed of the prime mover (road speed) is above the downshift point while the second gear is engaged, a downshift must be prevented. When the first gear has been pre-selected and the driving speed has diminished so far as to be below the downshift point, the downshift from the second to the first gear must be automatic.

When the pre-selected first gear is above the downshift point, the gear-change valve 2 is switched so that the servopump 10 is connected with the first work line 12. The pressure medium reaches the first annular duct 14. The recoil valve 8 is closed toward the connecting line 17. From the first annular duct 14, the pressure medium flows, via the annular duct 35 and the line 38 to the shuttle valve 6 which is held in its open position. Starting from here the pressure medium reaches the gear actuator device 3, via the line 39, the fourth annular duct 19 and the connecting line 16. The second gear is engaged.

Eventual leakage on the control edge pair 47 diminishes toward the line 41. The pressure prevailing in the gear actuator device 4 is diminished via the connecting line 17, the line 41, the open leakage valve 5, the line 41 and from here on, via the shuttle valve 6, toward the line 40, the second work line 13 and finally the tank line 11. Since the annular ducts 14 and 18 are separated from each other, it is not possible to downshift to the first gear.

If the driving speed drops below the downshift point, the pressure prevailing in the low-pressure chamber 23 drops. The control spring 33 moves the control slide 26 upward. While this takes place, the control edge pair 47 releases the connection of the annular ducts 14 and 18. Starting from the first work line 12, the pressure medium reaches, via the first annular duct 14, the third annular duct 18 and from here, via the connecting line 17, the gear actuator 4. The first gear is engaged. The hydraulic gear-changing mechanism is then in a state corresponding to the one in FIG. 1.

Since the control slide 26 performs an axial displacement movement precisely at the downshift point, the friction of a seal 44 must be kept as low as possible. The friction of said seal is less when it is pressureless. Through a discharge groove 45 the high pressure, at the switching point moment, is kept away from the seal 44 by holes 46. The friction of the seal is thus minimized.

Reference numerals
1 stop valve
2 gear-change valve
3 gear actuator
4 gear actuator
5 leakage valve
6 shuttle valve
7 pressure-limiting valve
8 recoil valve
9 -
10 servopump
11 tank
12 first work line
13 second work line
14 first annular duct
15 second annular duct
16 connecting line
17 connecting line
18 third annular duct
19 fourth annular duct
20 low-pressure pump
21 pressure medium tank
22 -
23 low-pressure chamber
24 low-pressure duct
25 -
26 control slide
27 valve cylinder
28 screw
29 spring chamber
30 -
31 -
32 -
33 control spring
34 annular duct
35 annular duct
36 first control groove
37 second control groove
38 line
39 line
40 line
41 line
42 stop
43 -
44 seal
45 discharge groove
46 bores
47 control edge pair
48 -
49 -
50 -

We claim:

1. A hydraulic changing device for a multi-ratio transmission comprising:

a gear change valve for shifting between a first position and a second position, said first position setting up connections of a pressure source with a first work line and a discharge source with a second work line, and said second position setting up connections of the pressure source with the second work line and the discharge source with the first work line;

a first gear actuator which is synchronized with a first gear and is actuated with pressure to be supplied from the first work line through a first annular duct and a third annular duct, a recoil valve being provided between the first annular duct and the third annular duct;

a second gear actuator which is synchronized with a second gear and is actuated with pressure to be supplied from the second work line through a second annular duct and a fourth annular duct or from the first work line through the fourth annular duct;

a shuttle valve having three ports, for shifting between a first position for connecting a first port and a second port, and a second position for connecting the second port and a third port, said first position being maintained by a spring bias, said second port being connected with the fourth annular duct and said third port being connected with the second annular duct and the third annular duct; and a stop valve having a control slide of a valve cylinder which has a first control groove and a second control groove, and is slidable for shifting between a first position and a second position, said first position being maintained by a control spring bias to connect the second annular duct with the fourth annular duct through the first control groove, and the second position being achieved against the control spring bias to connect the first annular duct and the first port of the shuttle valve through the second control groove by pressure of a low pressure pump which is driven in dependence upon a vehicle speed, when the stop valve is in its first position, the control slide is adapted to connect between the first annular duct and the third annular duct and between the second annular duct and the fourth annular duct through the first control groove, while, when the stop valve is in its second position, the control slide is adapted to disconnect the first annular duct with the third annular duct, but to connect it with the first port of the shuttle valve through the second control groove, and to disconnect the second annular duct with the fourth annular duct, whereby when the gear change valve is in its first position and the stop valve is in its first position, the pressure source is connected to the first gear actuator through the first work line, first annular duct and third annular duct, and the discharge source is connected with the second gear actuator through the second work line, second annular duct, first control groove and fourth annular duct, when the gear change valve is in its second position and the stop valve is in its first position, the pressure source is connected to the second gear actuator through the second work line, second annular duct, first control groove and fourth annular source, and the discharge source is connected with the first gear actuator through the first work line, first annular duct and third annular duct, when the gear change valve is in its second position and the stop valve is in its second position, the pressure source is connected to the second gear actuator through the second work line, second annular duct, third port and second port of the shuttle valve and fourth annular duct, and the discharge source is connected to the first gear actuator through the first work line, first annular duct, recoil valve and third annular duct, and when the gear change valve is in its first position and the stop valve is in its second position, the pressure source is connected to the second gear actuator through the first work line, first annular duct, second control groove, first port and second port of the shuttle valve and fourth annular duct, and the discharge source is connected to the first gear actuator through the second work line, second annular duct, third port of the shuttle valve and third annular duct.

2. The hydraulic changing device according to claim 1, wherein one front face of said control slide of said valve cylinder of said stop valve forms a low-pressure chamber which connects a low-pressure duct with said low-pressure pump where a pressure-limiting valve determines a minimum pressure.

3. The hydraulic changing device according to claim 2, wherein said control slide comprises, a seal between said low-pressure chamber and said first control groove, and a discharge groove is provided between said seal and said first control groove, said first control groove being connectable by holes with a pressure-medium tank of said discharge source.

4. The hydraulic changing device according to claim 3, wherein said control spring is housed in a spring chamber of said control slide which communicates with the holes and supports itself by a front-face aperture on said valve cylinder.

5. The hydraulic changing device according to claim 1, wherein said third annular duct is connectable, via said recoil valve, with said second work line and with said first work line, via a leakage valve, when a respective work line is pressureless.

* * * * *